(12) United States Patent
Mozak et al.

(10) Patent No.: US 9,665,527 B2
(45) Date of Patent: May 30, 2017

(54) DYNAMIC BUS INVERSION WITH PROGRAMMABLE TERMINATION LEVEL TO MAINTAIN PROGRAMMABLE TARGET RATIO OF ONES AND ZEROS IN SIGNAL LINES

(71) Applicant: Intel Corporation, Santa Clara, CA (US)

(72) Inventors: Christopher P Mozak, Beaverton, OR (US); James A McCall, Portland, OR (US); Bryan K Casper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 14/565,176

(22) Filed: Dec. 9, 2014

(65) Prior Publication Data

US 2016/0162434 A1    Jun. 9, 2016

(51) Int. Cl.
*G06F 13/20* (2006.01)
*G06F 13/42* (2006.01)
*G06F 13/40* (2006.01)

(52) U.S. Cl.
CPC ...... *G06F 13/4221* (2013.01); *G06F 13/4004* (2013.01); *G06F 13/4072* (2013.01); *G06F 13/4217* (2013.01); *Y02B 60/1228* (2013.01); *Y02B 60/1235* (2013.01)

(58) Field of Classification Search
CPC ............ G06F 13/4221; G06F 13/4217; G06F 13/4072
USPC .......................................... 710/104–106, 110
See application file for complete search history.

(56) References Cited

U.S. PATENT DOCUMENTS

| 7,522,073 | B1  | 4/2009  | Kao |
| 8,094,045 | B2* | 1/2012  | Hollis ................. G06F 13/4234 341/50 |
| 8,581,755 | B2* | 11/2013 | Abbasfar ............ G06F 13/4072 341/58 |
| 8,649,229 | B2* | 2/2014  | Vergis ...................... G11C 5/04 365/189.08 |
| 8,713,298 | B2* | 4/2014  | Joshi ................... G06F 13/4217 326/11 |

(Continued)

FOREIGN PATENT DOCUMENTS

WO    2007093906 A1    8/2007

OTHER PUBLICATIONS

International Search Report and Written Opinion for PCT Patent Application No. PCT/US2015/061611, Mailed Feb. 23, 2016, 11 pages.

*Primary Examiner* — Tammara Peyton
(74) *Attorney, Agent, or Firm* — Compass IP Law PC (57) ABSTRACT

Dynamic bus inversion (DBI) for programmable levels of a ratio of ones and zeros. A transmitting device identifies a number and/or ratio of ones and zeros in a noninverted version of a signal to be transmitted ("noninverted signal") and a number and/or ratio of ones and zeros in an inverted version of the signal ("inverted signal"). The transmitting device can calculate whether a difference of ones and zeros in the noninverted signal or a difference of ones and zeros in the inverted signal provides a calculated average ratio of ones to zeros closer to a target ratio. The transmitting device sends the signal that achieves provides the calculated average ratio closer to the target ratio.

22 Claims, 6 Drawing Sheets

(56) References Cited

U.S. PATENT DOCUMENTS

| | | | |
|---|---|---|---|
| 8,929,157 B2* | 1/2015 | Mozak | G05F 1/10 365/189.07 |
| 9,252,802 B2* | 2/2016 | Hollis | G06F 13/4221 |
| 2010/0052729 A1 | 3/2010 | Brox et al. | |
| 2012/0131244 A1 | 5/2012 | Abbasfar | |
| 2012/0131251 A1 | 5/2012 | Joshi | |
| 2013/0003468 A1 | 1/2013 | Vergis | |
| 2014/0140146 A1 | 5/2014 | Mozak et al. | |
| 2014/0289440 A1 | 9/2014 | Shu | |
| 2016/0019179 A1 | 1/2016 | Loke et al. | |
| 2016/0162214 A1 | 6/2016 | McCall et al. | |

\* cited by examiner

DYNAMIC BUS INVERSION WITH
PROGRAMMABLE TERMINATION LEVEL
TO MAINTAIN PROGRAMMABLE TARGET
RATIO OF ONES AND ZEROS IN SIGNAL
LINES

FIELD

Embodiments of the invention are generally related to memory subsystems, and more particularly to a dynamic bus inversion implementation that implements inversion to maintain a programmable target ratio of ones to zeros.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2014, Intel Corporation, All Rights Reserved.

BACKGROUND

Inter-chip communication provides the signaling between components of computing systems. A transmitting device sends a signal or bit pattern to a receiving device. Data bus inversion has traditionally been used to minimize the number of one or zeros transferred over a data bus. Bus inversion refers to inverting every bit on a bus prior to transmission. Such an inverted bus is accompanied by a bit or signal indicating that the bus has been inverted, which allows the receiving device to appropriately interpret the received data. Such a concept has been further extended to buses other than the data bus, and will be referred to generally herein as dynamic bus inversion (DBI), which can include any collection or group of signal lines, including one or more buses. As mentioned, DBI has been used to invert a signal line group to minimize the number of bits that have a specified logic level. For example, if the transmitting device seeks to minimize the number of ones sent, then for a group of signal lines that has more ones than zeros, the transmitting device can invert the signal lines and generate an inversion indication. The same can be accomplished in reverse for a transmitting device seeking to minimize the number of zeros.

An extended use of DBI involves minimizing the switching of signals in the signal line group. In such a use, instead of determining if there are more ones or zeros and inverting the signal line group to minimize the desired logic state, the transmitting device can determine if the output bit pattern will toggle more signal lines than signal lines that will remain the same. Thus, if the output bit pattern has more transitions from zero-to-one or one-to-zero than signal lines that will transmit the same logic value as a previous transmission, the transmitting device can invert the bus and generate the inversion indication. Such an operation can reduce the number of toggles in the group of signal lines for consecutive transmissions.

However, as power consumption considerations increase in importance in modern electronics with lower voltages and tighter power budgets while transfer speeds increase, DC (direct current) balance in inter-chip communication becomes a performance factor of interest. DBI looks only at two consecutive transmissions, determining what to transmit in the current transaction based on the immediately preceding transaction. Depending on the signals transferred, DBI can actually degrade DC balance on the signal line group. For example, consider an 8 bit bus where the transmitting device seeks to minimize the number of ones. If more than 4 of the bits are ones, the transmitting device will invert the bus and send more than 4 zeros. In either case there is not DC balance on the bus.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a system employs dynamic bus inversion (DBI) to achieve a desired ratio of ones to zeros across a group of signal lines over a period of time. The ratio can be a programmable level preconfigured for a device and/or set dynamically in the system. To employ DBI to achieve a desired ratio of ones to zeros, a transmitting device identifies a number and/or ratio of ones and zeros in a noninverted version of a signal to be transmitted or output (the "noninverted signal") and a number and/or ratio of ones and zeros in an inverted version of the signal (the "inverted signal"). The transmitting device can calculate whether the ratio of ones to zeros in the noninverted signal or the inverted signal will provide a calculated average ratio closer to a target ratio. The target ratio represents the desired ratio that can be set by preconfiguring the transmitting device and/or dynamically configuring the device for operation. The transmitting device sends the signal that achieves the calculated average ratio closer to the target ratio. If adding the ratio of the noninverted signal to the calculated average ratio provides the average ratio closer to the target ratio, the transmitting device sends that signal without generating an inversion indication. If adding the ratio of the inverted signal to the calculated average ratio provides the average ratio closer to the target ratio, the transmitting device sends the inverted signal and generates an inversion indication.

It will be understood that achieving a desired ratio of ones to zeros can be any desired ratio. There can be advantages to having a particular ratio of ones to zeros that is not one-to-one. In one embodiment, the desired ratio is one-to-one, or an equal number of ones and zeros. An equal number of ones and zeros can be considered to achieve DC (direct current) balance on an inter-chip interface. As used herein, the interface refers to the mechanisms used to allow one chip or one device to communicate with another. The interface can refer to hardware and/or software components involved with inter-device communication. For example, an interface typically includes drivers and/or transceivers for sending and receiving over a signal line or other transmission line. The interface can include a pin or ball or other interconnection mechanism. Additionally, the devices include a controller or other logic to determine what signals to send on what pins, what timing to use, and/or other factors is exchanging signals.

In one embodiment, such a controller can calculate or otherwise determine a DBI to achieve a desired ratio of ones to zeros. For example, the controller can calculate and maintain a net ratio of ones to zeros for a bus or group of signal lines associated with a DBI signal. The controller can maintain the ratio as a net DC balance history for the signal lines every cycle, and add DBI control to affect the ratio, and thus affect the DC balance. In one embodiment, the controller or other logic maintains a signed count on the (net number of ones minus net number of zeros) that has been sent. It will be understood that the calculation could alternatively be performed as the net number of zeros minus the net number of ones. In one embodiment, the controller or logic can control the DBI bit to minimize the absolute value of the computed signed count. In one embodiment, the controller or logic can control the DBI bit to minimize variance of the absolute value of the computed signed count from a programmable target value. In one embodiment, the transmitting device is preprogrammed with a target value. In one embodiment, the transmitting device programs the target value based on a command or signal from a host device. In one embodiment, the host device programs the target value. The target value can be programmed based on a power management subsystem or other control logic.

It will be understood that using DBI to maintain a ratio of ones to zeros is not necessarily mutually exclusive with applying DBI for other purposes. For example, in one embodiment, if a system has a target net error (or target net signed count), and the net error during a given cycle is small for either value of DBI, the logic could instead calculate DBI to reduce the number of toggles and save power. Other examples of using DBI to both achieve a ratio of ones to zeros and perform a traditional DBI function can be utilized.

It will be understood that as inter-chip communication speeds increase while transmission power goes down, high frequency noise can degrade the signaling. DC balancing inter-chip signaling can reduce the high frequency noise and improve signal quality. In one embodiment, a system can use a weighted approach to the application of DBI. For example, the on-chip controller responsible for signal transmission can factor both ratio of ones and zeros, and number of a particular logic value (or a number of toggles) when determining whether to invert the output signal. In such an implementation, the controller can apply a weighted algorithm that employs DBI for both purposes.

For example, the controller can determine to apply DBI to invert the signal group under any of the following circumstances. In one embodiment, the controller only determines whether to apply DBI to achieve a ratio of ones to zeros if the difference between the number of ones and zeros is below a threshold or within a predetermined range, and otherwise it applies DBI to minimize the number of a particular logic value. Conversely, in one embodiment, the controller only determines whether to apply DBI to minimize the number of a particular logic value if the difference between the number of ones and zeros is below a threshold or within a predetermined range, and otherwise it applies DBI to achieve a ratio of ones to zeros. In one embodiment, the controller determines whether to apply DBI to achieve a ratio of ones to zeros for a number of consecutive output transactions, and then applies DBI to minimize the number of a particular logic value, and then repeats the sequence for a number of consecutive output transactions. In such an implementation the number of transactions for applying DBI to achieve a ratio of ones to zeros is not necessarily equal to the number of transactions for applying DBI to minimize the number of a particular logic value, although they may be. It will be understood that others could also be considered.

In one embodiment, DBI can be calculated across a series of consecutive output transactions, such as N transactions, in parallel as opposed to the more common serial implementation that only looks at one transaction at a time. Traditional DBI evaluates only a single transaction for DBI, and either implements or does not implement DBI on a single transaction at a time. The DBI described herein that can achieve a target ratio can determine DBI for a number of transactions at a time. By looking at multiple transactions, the DBI can further reduce the power while improving the DC balance. For example, a DBI decision engine can compute DBI to achieve a target ratio every N transactions, and perform traditional DBI on a transaction-by-transaction basis for each of the N−1 transactions in between. In one embodiment, the transmit data can be made available (e.g., buffered) as N parallel wires, where the DBI logic can look at future transactions, which can improve the decision making for trading off between multiple different types of DBI (e.g., achieving a target ratio and reducing a number of ones, for example). Thus, in one embodiment, computations related to a target ratio of ones to zeros can be made over a series of transactions, while other forms of DBI can still be performed on each output transaction.

The transmitting device performs DBI by looking at multiple transactions at a time. Thus, the transmitting device keeps a history of a number of consecutive transmissions to apply DBI to achieve the target ratio of ones to zeros over time. In one embodiment, the transmitting device keeps the history in an accumulator. It will be understood that other storage logic could be used to keep a history of DBI. In one embodiment, the transmitting device keeps DBI separately for different groups of signal lines. In one embodiment, in a memory device, the memory controller can keeps DBI for different channels, different devices, or different ranks. For example, assume a memory subsystem with multiple ranks. With a single accumulation or history circuit, one rank could ramp away from the target ratio in the positive direction, while another rank could ramp away from the target ratio in the negative direction, but overall the subsystem could appear to achieve the target ratio. With different accumulators for the different ranks, the memory controller can apply DBI separately to the different ranks to achieve the target ratio on each rank individually. Thus, for example, assuming Rank0 and Rank1, the memory controller can have Accumulator0 and Accumulator1 to separately monitor the target ratio. When transmitting to Rank0, the memory controller can keep the history in Accumulator0. Similarly, when transmitting to Rank1, the memory controller can keep the history in Accumulator1. Such a concept can be extended to any number of ranks, or to channels, devices, or other granularity of control.

In one embodiment, the history logic or accumulator can be a "leaky bucket" accumulator. A leaky bucket accumulator persists information for only a period of time. By leaking error information or other information kept as a history, the accumulator does not persist the error indefinitely, but the transmitting device keeps the history as a sliding window. For example, consider a memory device having VTT termination, where the memory device has a bandwidth of X MHz. In such an example, the memory controller can keep a sliding window of approximately X MHz worth of history. Thus, the memory controller can leak away or drop the error information at a rate similar to the bandwidth of the memory device. In general, the transmitting device can use a leaky accumulator that can be similar in bandwidth, but not necessarily exactly the same bandwidth, as the bandwidth of the receiving device.

In one embodiment, the inter-chip communication occurs between a memory device and a host. The host can be a memory controller. The memory controller can be a stand-alone device or integrated into a processor. The memory controller can be part of the same chip that has the processor. The memory controller interfaces with the memory devices and generates memory access commands corresponding to needs to access data requested for operations by the central processor, graphics processor, and/or other processing unit. In one embodiment, the inter-chip communication occurs between any two devices in a computing system or computing device. Thus, the descriptions herein can apply equally well to memory technologies not specifically identified, and can also apply to inter-device communication for devices of any type that share a common bus that can be inverted. The inter-chip communication in accordance with any embodiment described herein can be applied to any single-ended interface between two devices that share a group of signal lines that can be inverted. A single-ended interface measures a signal versus a voltage rail or reference voltage. A differential interface conveys a signal in reference to a signal complement on an associated line.

Reference to memory devices can apply to different memory types. Memory devices generally refer to volatile memory technologies. Volatile memory is memory whose state (and therefore the data stored on it) is indeterminate if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), LPDDR3 (low power DDR version 3, JESD209-3B, August 2013 by JEDEC), LPDDR4 (LPDDR version 4, JESD209-4, originally published by JEDEC in August 2014), WIO2 (Wide I/O 2 (WideIO2), JESD229-2, originally published by JEDEC in August 2014), DDR5 (DDR version 5, currently in discussion by JEDEC), LPDDR5 (currently in discussion by JEDEC), and/or others, and technologies based on derivatives or extensions of such specifications.

Reference to memory devices can apply to different memory types. Memory devices generally refer to volatile memory technologies. Volatile memory is memory whose state (and therefore the data stored on it) is indeterminate if power is interrupted to the device. Dynamic volatile memory requires refreshing the data stored in the device to maintain state. One example of dynamic volatile memory includes DRAM (dynamic random access memory), or some variant such as synchronous DRAM (SDRAM). The memory subsystem described herein may be compatible with a number of memory technologies, such as LPDDR4 (LOW POWER DOUBLE DATA RATE (LPDDR) version 4, JESD209-4, originally published by JEDEC (Joint Electronic Device Engineering Council) in August 2014), and/or others, and technologies based on derivatives or extensions of such specifications. The memory includes multiple ranks of memory. In one embodiment, the memory subsystem issues multiple commands to perform a single memory access operation. In one embodiment, each command is a multi-cycle command.

Figure 1:
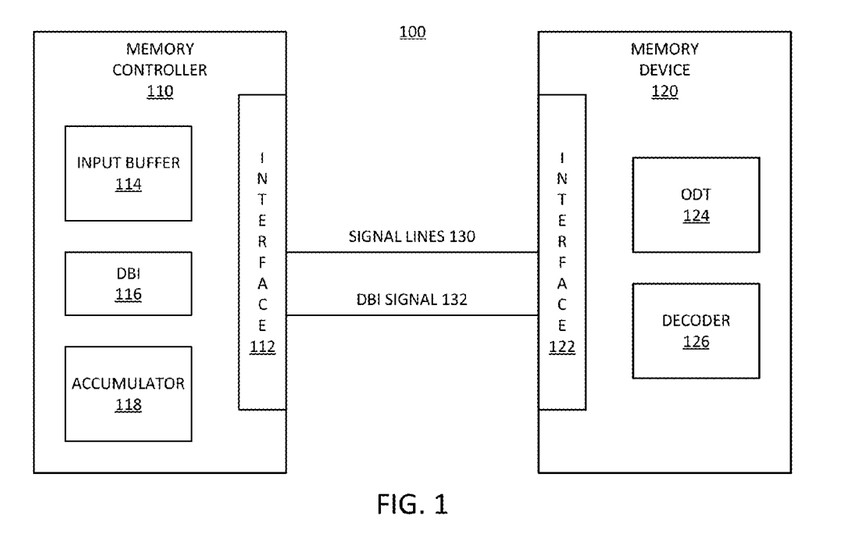
FIG. 1 is a block diagram of an embodiment of a system that performs dynamic bus inversion to maintain a target ratio of ones to zeros.

FIG. 1 is a block diagram of an embodiment of a system that performs dynamic bus inversion to maintain a target ratio of ones to zeros. System 100 represents components of a memory subsystem that engage in inter-device communication. Namely, memory controller 110 and memory device 120 communication over an input/output (I/O) interface that includes signal lines 130. While a memory subsystem is specifically represented, it will be understood that any devices communicating over a group of signal lines and having an accompanying inversion signal can perform the inter-device communication discussed herein. Furthermore, it will also be understood in that the descriptions below refer to an embodiment where memory controller 110 applies DBI to a signal sent to memory device 120. In one embodiment, memory device 120 could apply DBI on a signal sent to memory controller 110. Thus, system 100 is one example, which can be representative of any of a number of configurations in which two devices engage in inter-device communication, dynamically applying DBI to achieve a target ratio of ones to zeros in the communication.

Interface 112 of memory controller 110 represents hardware connections at the memory controller that enable it to interface with external devices. Similarly, interface 122 of memory device 120 represents hardware connections at the memory device that enable it to interface with external devices. In system 100, interfaces 112 and 122 enables memory device 110 to communicate with memory device 120 over signal lines 130. Signal lines 130 represent traces or wires that interconnect the two devices. Interfaces 112 and 122 can include pins, balls, pads, and/or other hardware to interface with signal lines 130. Interfaces 112 and 122 are controlled by logic that operates, respectively, on memory controller 110 and memory device 120. The logic can include hardware, software (i.e., firmware), or a combination. The logic controls the timing and the driving of the signal lines to send and receive digital signals across the interface (referring to all of interface 112, interface 122, and signal lines 130).

It will be understood that interfaces 112 and 122 can also include other signal line groups not specifically shown. The connection between memory controller 110 and memory device 120 can include one or more signal lines that are not part of a signal line group that can be inverted. In one embodiment, signal lines 130 include a single bus of signal lines (e.g., a data bus). In one embodiment, signal lines 130 span multiple buses of signal lines. In one embodiment, signal lines 130 include a bus and one or more other signal lines that are all inverted together. There are any number of combinations, which will be dependent on the architecture and system configuration of the interconnection between two devices. Thus, what is depicted in system 100 is solely for illustration, and is not limiting.

As one embodiment of a flow of operation, consider that memory controller 110 receives one or more requests from a host or host processor. The host processor can include a central processing unit that executes instructions in accordance with a host operating system and/or applications executing on a computing device that system 100 is a part of. The host processor can include a graphics processing unit or other controller that generates a request for data from memory device 120. Memory controller 110 includes input buffer 114 or other buffer or cache mechanism to receive requests for data from memory device 120. Input buffer 114 represents any type of buffer that can be used in memory controller 110, and will not be described specifically herein. Input buffer 114 enables memory controller 110 to receive a request from the host and appropriately dequeue the request to send to memory device 120.

In one embodiment, memory controller 110 includes DBI 116, which represents hardware and/or software logic that enables memory controller 110 to implement dynamic bus inversion. DBI 116 includes at least control logic to determine when to invert the signal send over signal lines 130, control logic to trigger the inversion of the signal lines, and a control mechanism to trigger DBI signal 132 when signal lines 130 are to be inverted. In one embodiment, DBI 116 is programmable with different target ratios of ones to zeros. For example, in one case DBI 116 can have a target ratio of 50% or a one-to-one ratio of ones and zeros. Such a ratio can be useful for achieving a balanced DC offset and reducing high frequency noise in the case of high-speed communication. In one case DBI can have a different ratio, which can be described as either a percentage (meaning a percentage of one logic state (either ones or zeros) to the total number of bits in the signal) or some other representation such as one-to-one, two-to-one, 4-to-5, or something else. It will be understood that a DC offset other than zero is useful in certain common mode scenarios, which can be achieved with a target ratio other than 50%.

In one embodiment, DBI 116 is a conventional DBI engine modified with a DBI calculator that attempts to achieve a particular ratio of zeros to ones or ones to zeros. In one embodiment, the control logic of DBI 116 can implement combinations of attempting to achieve a programmed or specified ratio of ones to zeros (which can be referred to as high frequency balancing) as well as implementing conventional DBI, which typically attempts to reduce power consumption. Thus, applying DBI to achieve a target ratio of ones to zeros can implement high frequency balancing, and applying conventional DBI can implement power control. As described herein, DBI 116 can be enabled to implement only high frequency balancing, or to implement high frequency balancing in addition to implementing power control. The application of both mechanisms can be in accordance with any embodiment described herein.

In one embodiment, memory controller 110 includes accumulator 118 to keep a running net count of ones and zeros that are transmitted over signal lines 130. It will be understood that another buffering mechanism could be used in place of an accumulator circuit. An accumulator circuit can provide the accumulation information to allow a running net with very little logic requirements. In one embodiment, accumulator 118 is part of DBI 116 (e.g., a dedicated internal circuit). In one embodiment, accumulator 118 represents multiple accumulator devices used to keep running totals of ones and zeros for signal lines 130. In one embodiment, accumulator 118 maintains a running net signed difference of ones and zeros transmitted over the interface.

In one embodiment, interfaces 112 and 122 can include multiple signal line groups that are controlled separately for inversion. Thus, for example, in addition to signal lines 130 and the associated DBI signal 132 that controls inversion of the signal lines in group 130, there can be additional signal line groups, each with an associated DBI signal. In such a configuration, DBI 116 and/or accumulator 118 can be duplicated for other groups of signal lines and associated DBI signals. In one embodiment, DBI 116 can include a register or other storage device to store DBI information for one group of signal lines, and can reuse DBI logic 116 and/or accumulator 118 for other groups of signal lines. In one embodiment, whether with duplicated DBI logic 116 or with a signal DBI engine that time multiplexes control over multiple groups of signal lines, different target ratios can be applied to different signal lines on the same interface between two devices.

DBI 116 can identify the number of ones and zeros in the signal to be sent. In one embodiment, DBI 116 identifies the number of ones and zeros in both a noninverted version of the signal (e.g., a "noninverted signal") and an inverted version of the signal (e.g., an "inverted signal"). DBI 116 can compute a difference (often referred as an "error" when performing mathematical logic calculations) between the numbers of ones and zeros in both the inverted signal and the noninverted signal. In one embodiment, DBI 116 determines based on such computations whether the noninverted signal or the inverted signal (based on the numbers of ones and zeros) will move a calculated average ratio or running total (e.g., a running net as referred to above) closer to the target ratio. The calculated average ratio is determined with reference to accumulator 118 or substitute logic. In one embodiment, DBI 116 compares the computed values of the noninverted signal and the inverted signal to determine which signal moves the calculated average closer to the target value. DBI 116 can then trigger transmission of the signal that moves the calculated average ratio closer to the target ratio. When the inverted signal moves the calculated average ratio closer to the target ratio, DBI 116 will trigger a DBI indication over DBI signal 132.

In one embodiment, memory device 120 includes ODT (on-die termination) 124 and decoder 126. Decoder 126 represents receiving logic at the memory device that samples or reads the signals transmitted by memory controller 110 over signal lines 130. Decoder 126 decodes or interprets the signals represented on signal lines 130 to determine what operation(s) should be executed based on the command and/or address information in the particular signal of signal lines 130. Thus, decoder 126 can sample the logic state of DBI signal 132 (which could indicate inversion by either a high or low logic level, depending on the implementation), and determine whether to read the value of the signal on signal lines 130 exactly as received, or whether to invert the received signal prior to or as a part of decoding.

ODT 124 represents logic at memory device 120 to terminate signal lines 130 to avoid reflections and improve the signal quality of signals receive via signal lines 130. ODT is well understood and will not be discussed in detail herein. In one embodiment, ODT 124 terminates one or more of signal lines 130 at a VTT or midrail termination. A midrail termination will be understood as being between a high-voltage rail (e.g., VDD or a value set for communication) and a low-voltage rail (e.g., VSS). More specifically, a midrail termination can be midway between the output high voltage and the output low voltage (which may be other than VDD and VSS, respectively). In one embodiment, VTT can be understood as a voltage point that equalizes the current in a pull-up leg and pull-down leg of an output driver. Applying VTT termination can improve power consumption and certain signaling issues traditionally present in high speed connections (e.g., improving the capacitive effects of having to drive the signal line hard enough to achieve a clean signal from one rail to the other). VTT can provide a well-controlled, fixed reference voltage or Vref level to the receiver that is independent of the termination strength. However, VTT termination can introduce DC balancing issues that can be exacerbated by DBI. As described herein, DBI 116 can achieve a ratio of ones and zeros that can balance the DC offset to an equivalent value of the VTT termination. Such balancing can allow for a simpler and cheaper regulator circuit design.

Figure 2:
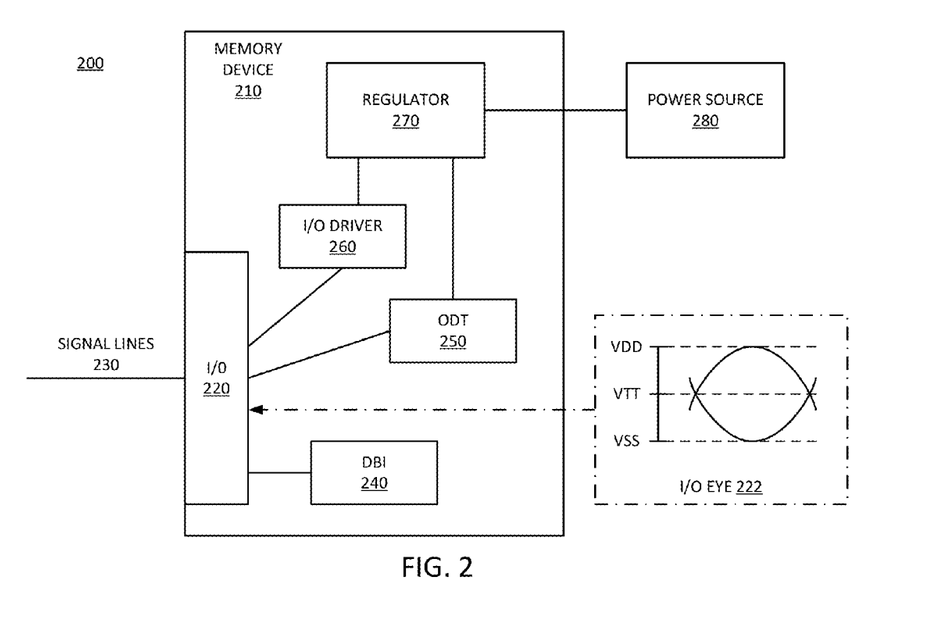
FIG. 2 is a block diagram of an embodiment of a system that implements dynamic bus inversion to maintain a desired DC offset on an I/O interface.

FIG. 2 is a block diagram of an embodiment of a system that implements dynamic bus inversion to maintain a desired DC offset on an I/O interface. System 200 represents a memory device that can be implemented in any inter-device communication system described herein, such as in system 100 of FIG. 1. In one embodiment, memory device 210 represents the device that receives and decodes a signal that is subject to the application of DBI. In one embodiment, memory device 210 represents the device that generates and sends a signal that is subject to the application of DBI.

Memory device 210 includes I/O 220, which represents an I/O interface over which memory device 210 can send and/or receive signals. Memory device 210 is connected to an external device, such as a memory controller, via signal lines 230. Signal lines 230 represent a group of signal lines that are subject to the application of DBI. A separate DBI indication signal is not shown in system 200, and can be understood to be part of signal lines 230. Signal lines 230 have an associated DBI indication signal to indicate when the signal is inverted.

Memory device 210 includes DBI logic 240. In one embodiment, DBI logic 240 is similar to DBI logic 116 of system 100, and can function in accordance with anything described with reference to DBI 116. Thus, in one embodiment, memory device 120 implements DBI as a transmitting device. For example, when memory device 210 receives a command from an associated memory controller (not specifically shown), the memory retrieves the data and transmits the data to the requesting controller. In one embodiment, DBI 240 represents logic that enables memory device 210 to decode signal lines 230 based on a DBI indication signal. Thus, memory device 210 can correctly access the memory elements (not specifically shown) and execute a command transmitted by the memory controller.

In one embodiment, memory device 210 includes ODT 250, which enables the memory to implement dynamic termination for signal lines 230. In one embodiment, ODT 250 terminates signal lines 230 to VTT. As illustrated in I/O eye 222 associated with I/O 220, VTT is a voltage level in between VDD and VSS, where VDD and VSS represent the high voltage rails of the signals exchanged (transmitted or received) over signal lines 230, and are not necessarily equivalent to system VDD and system VSS. In one embodiment, VTT is located halfway between VDD and VSS. However, it will be understood that VTT can be located somewhere between VDD and VSS that is not halfway between.

In one specific application, discussions are currently underway to determine how to provide increased power efficiency while increasing data rates for LPDDR5 and/or DDR5 technologies. On-die VTT-based termination on the memory devices has been discussed as one possibility to increase power efficiency in a memory subsystem. VTT-based termination can reduce the termination power by a factor of two and make the power more independent of termination strength.

However, it will be understood that ODT terminates to a power source and/or a regulator as represented by regulator 270 and power source 280. Power source 280 is illustrated outside of memory device 210 indicating that power is generated outside of the memory device and power provided to memory device 210. In one embodiment, regulator 270 is within memory device 210. Thus, regulator 270 receives a power supply from power source 280 and generates the reference and/or rail voltages for operation of I/O 220. The regulators used on modern host systems (e.g., processor systems, which commonly include a memory controller integrated on a common die with the processor) can be high bandwidth, non-linear regulators. Such regulators can require high speed transistors and can have significant design and manufacturing constraints. The requirements of such regulators may not be normally achievable by the processes and technologies used to generate memory device 210. By controlling the DC balance of communication over signal lines 230, the VTT-based dI/dt can be reduced, allowing for a simpler, lower bandwidth regulator design.

Thus, in one embodiment, DBI 240 represents, either at the end of an associated memory controller, or at memory device 210, or both, an application of DBI that achieves a target ratio of ones to zeros. Achieving a target ratio within a given tolerance can provide a desired DC balance to output data. It will be understood that DBI 240 will attempt to achieve a target ratio, but constantly maintaining exactly the target ratio may not be practical. Thus, along with a target or desired ratio, system 200 can allow a tolerance or accepted variance from the target ratio. DBI 240 applies DBI to signals to be output over I/O 220 to maintain a desired DC balance, which can balance a desired net current entering and leaving a VTT node (or the node to which the I/O is terminated.

As discussed above, DBI 240 can keep track of the net number of ones and/or zeros transmitted over I/O 220. DBI 240 can calculate the DBI bit or DBI indication signal to keep the net number as close to a target as possible. In one embodiment, the target is zero. Thus, as regulator 270 generates a VTT voltage or provides a VTT node, the VTT voltage regulation can provide a DC supply value with lower bandwidth and current than would otherwise be needed to achieve the desired performance. In such an implementation, regulator 270 can reduce noise on the VTT node with a relatively modest amount of local decap (noise filtering capacitive coupling).

Memory device 210 include I/O driver 260, which represents control logic to drive an output over I/O 220 or transmit over signal lines 230. I/O driver 260 includes circuits that generate the desired bit values or logic values for the signals and drive the I/O to produce the desired logic value at the receiving end of the I/O interface. I/O driver 260 and ODT 250 operate in conjunction to send and receive data over I/O 220.

Figure 3:
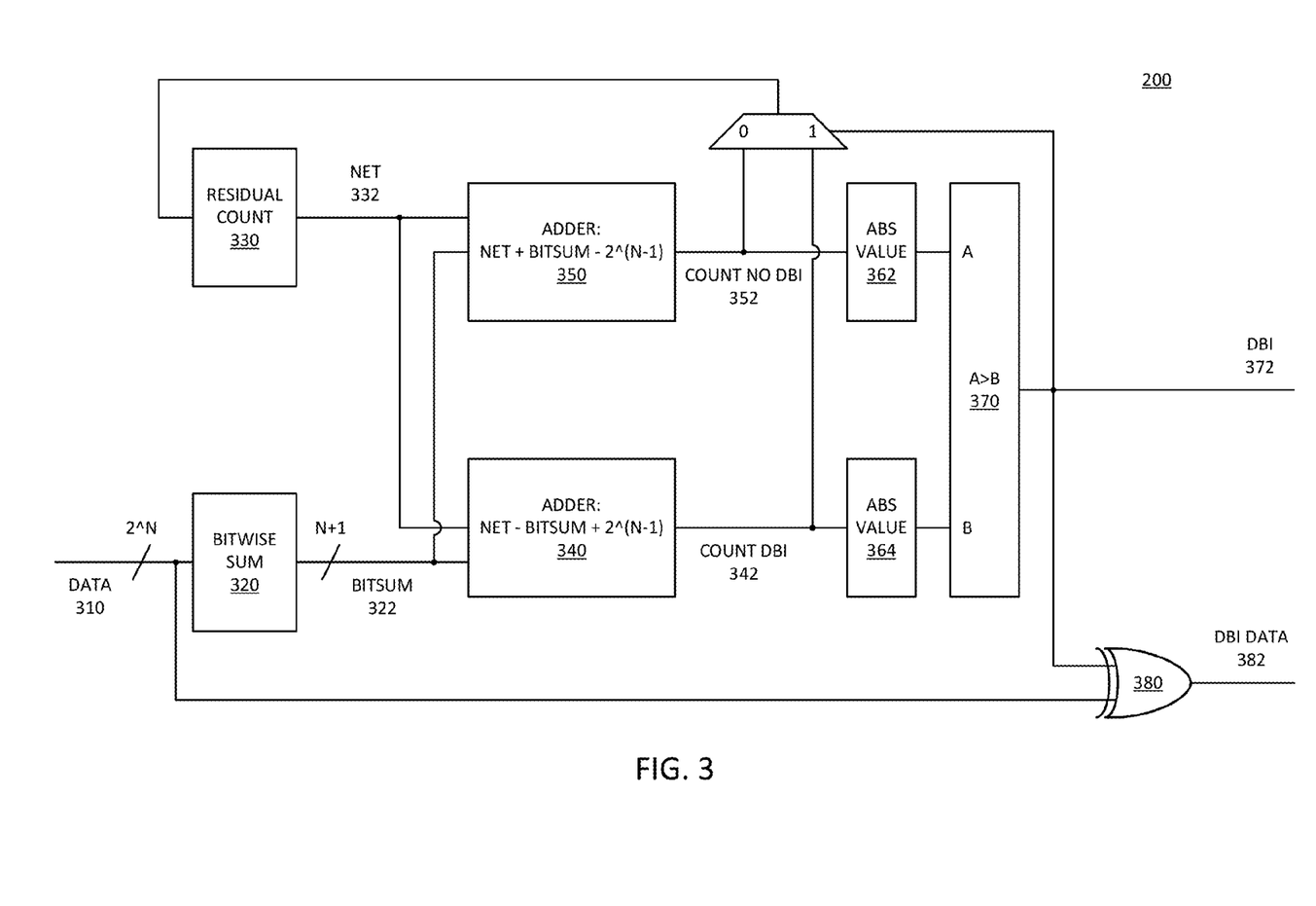
FIG. 3 is a block diagram of an embodiment of dynamic bus inversion logic.

FIG. 3 is a block diagram of an embodiment of dynamic bus inversion logic. Circuit 300 represents one embodiment of a DBI engine for achieving a desired ratio of ones and zeros. In one embodiment, circuit 300 is shown configured to achieve a one-to-one or 50% ratio. However, circuit 300 could be modified to achieve a different ratio.

Circuit 300 receives data 310. Data 310 represents data to be output on a group of signal lines associated with the logic of circuit 300. In one embodiment, data 310 includes $2^N$ bits of data. The number can be different, and is not necessarily a binary number, although the logic may be simpler when working with binary numbers. In one embodiment, to the extent that the actual number of signal lines is a non-binary number, circuit 300 can operate on data 310 as though there are $2^N$ signal lines, and bit-stuff the unused signal lines with appropriate logic values (e.g., with zeros). In one embodiment, circuit 300 generates bitwise sum 320 from data 310, which can be a number with N+1 bits. Bitsum 322 represents the output of bitwise sum logic 320.

In one embodiment, circuit 300 receives bitsum 322 at adder 340 and adder 350. Adder 340 computes a value of the net or running calculated average minus the bitsum (net 332—bitsum 322) plus $2^{N-1}$. In one embodiment, adder 340 computes the difference from net for an inverted signal (a signal that is inverted). Adder 350 computes a value of the net plus the bitsum (net 332+bitsum 322) minus $2^{N-1}$. In one embodiment, adder 350 computes the difference from net for a noninverted signal. Adding or subtracting $2^{N-1}$ is the equivalent of normalizing the value to a midrail, such as in the configuration where VTT is used, and logic attempts to keep the running net as close to the "zero" of VTT as possible. It will be understood that adders 340 and 350 can be programmable and configured to apply a different normalization value, or apply none at all, depending on the configuration of the system in which circuit 300 is implemented.

Count DBI 342 represents a signed count that is a difference or error from the target (e.g., 50% or some other target) for the inverted signal. Count no DBI 352 represents a signed count that is a difference or error from the target for the noninverted signal. In one embodiment, circuit 300 determines whether count 342 and count 352 represents a value that is closer to the desired target. In one embodiment, absolute value logic 362 generates an absolute value on signed count 352. In one embodiment, absolute value logic 364 generates an absolute value on signed count 354. In one embodiment, logic 370 can determine if the absolute value of count 352 is greater than the absolute value of count 342. The output of the determination can be used to compute DBI data 382 at logic 380. The output can also act as DBI signal 372, which is a DBI indication to be generated by circuit 300.

In one embodiment, the output of logic 370 can also act as a select control for a multiplexing circuit that adds the selected count to the net count. Thus, the multiplexer can add signed count 342 to the calculated running average if DBI is to be used, and add signed count 352 to the calculated running average if DBI is not used for the signal. The multiplexer feeds the selected count to residual count 330, or equivalent counter block. Residual count 330 maintains running net 332, which is used in the calculations in circuit 300 to determine whether to use DBI on a subsequent transaction. Thus, the previous net is used to make a calculation, and then the computed counts are added to the net for a subsequent calculation.

Figure 4:
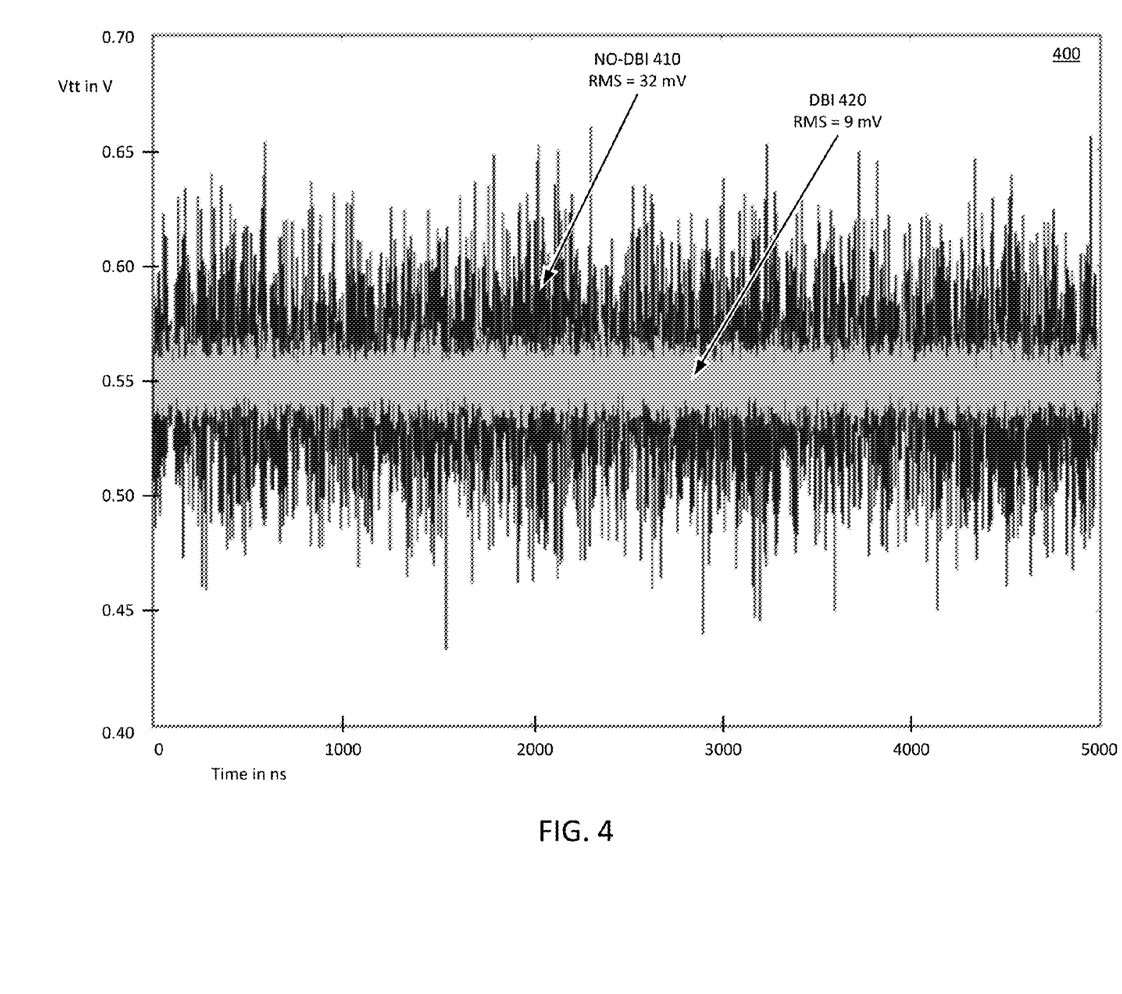
FIG. 4 is a representation of an embodiment of a behavioral simulation that compares output noise for a system using dynamic bus inversion to maintain a target ratio of ones to zeros versus a system that does not.

FIG. 4 is a representation of an embodiment of a behavioral simulation that compares output noise for a system using dynamic bus inversion to maintain a target ratio of ones to zeros versus a system that does not. Diagram 400 illustrates simulation results for a memory interface for two cases: in the first case no DBI was applied on the interface, and in a second case DBI was applied solely to achieve a target ratio of ones and zeros. A use case of a hybrid application of DBI, where DBI is applied at least some of the time to achieve a target ratio of ones and zeros and at least some of the time to either reduce transmission of a specific logic level or reduce logic transitions, was not simulated.

In diagram 400, the middle gray area represents the behavior for a VTT regulator for an inter-device interface. Specifically, the voltage spikes over time represent output noise for different random data patterns as generated by a scrambled bus test. It will be observed that case 410 has much higher noise on the regulator output than case 420. It will be understood that case 420 is overlaid over case 420 in diagram 400 for purposes of comparison. Thus, the middle of case 410 is not visible due to being obscured by case 420. In case 420 DBI was applied to achieve a target ratio of ones and zeros. Specifically, case 420 sought to achieve a one-to-one ratio of ones and zeros. It will be observed that the nominal DC voltage level is approximately 550 mV, with the high frequency noise relatively quiet. Observe that in case 420, the application of DBI to achieve a one-to-one ratio of ones to zeros resulted in a root mean square (RMS) noise value of approximately 9 mV. In case 410 no DBI was applied to transmission over the interface. The high frequency noise contribution is represented by the darker noise spikes. It will be understood that diagram 400 represents case 420 being overlaid onto case 410. In case 410 the nominal DC voltage level is still 550 mV, but the RMS of the noise is 32 mV, or more than three times that of case 420.

In the simulations illustrated in diagram 400, the regulator simulated for case 410 (no DBI) was a high bandwidth regulator with a response time of <2 ns. For case 420 (DBI to achieve net zero difference between ones and zeros), the regulator only had to supply the DC value and required effectively zero bandwidth. Other than the difference in regulators, the simulations for cases 410 and 420 use the same model in terms number of drivers, current, and decap. Thus, case 420 reduces noise by more than 3× with respect to case 410, and does so with a significantly simpler regulator design.

As mentioned previously, the target ratio of ones to zeros is programmable. Such programmability can be useful for different use case scenarios. For example, in the case of LPDDR4, the DRAM or memory device transmitter limits the common mode to under approximately 200 mV. In such a case, a DBI engine can be programmed to achieve a ratio of ones to zeros that achieves the desired common mode DC offset. In one embodiment, the DBI calculation engine can include an offset to program an arbitrary ratio of ones and zeros as a target. Thus, while maximum power efficiency for VTT terminations can generally be achieved at a 50% ratio, there may be many considerations and many implementations where other ratios are desired for the target ratio.

Figure 5:
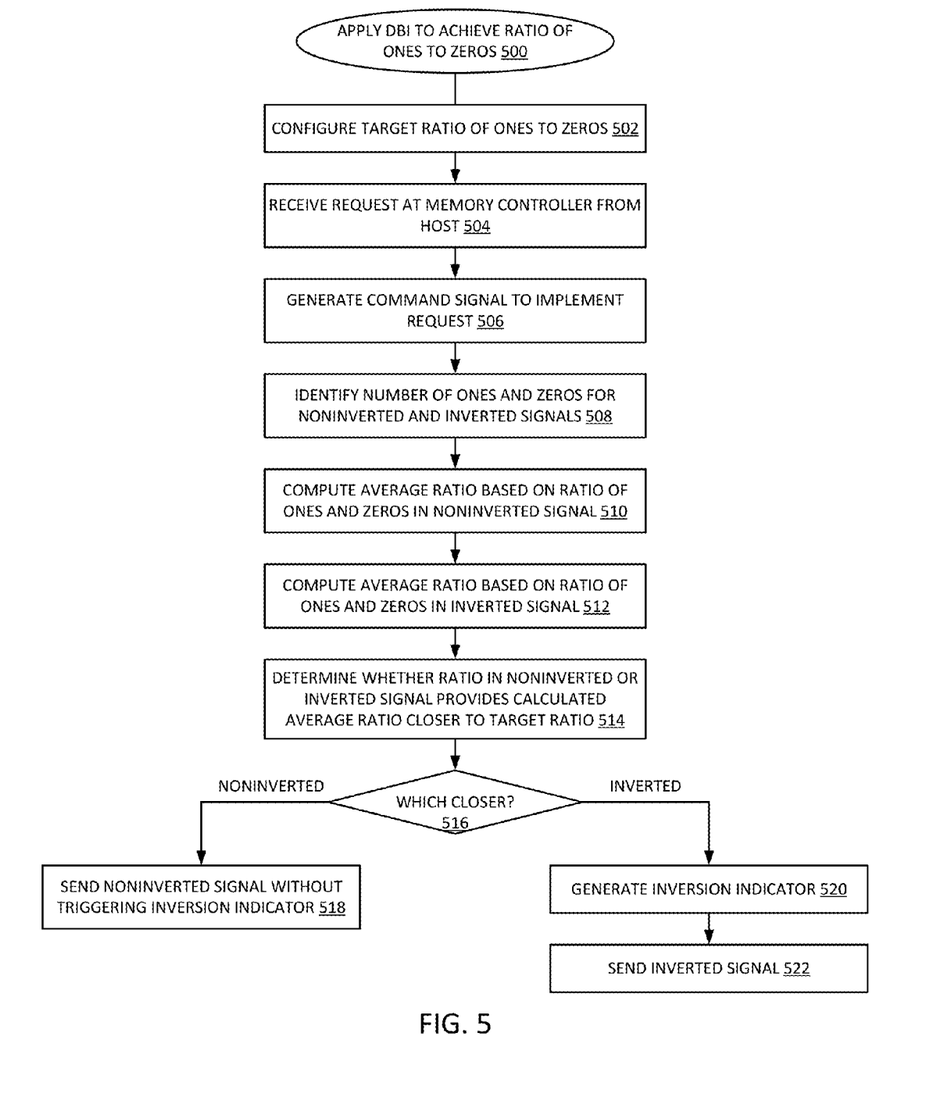
FIG. 5 is a flow diagram of an embodiment of a process for implementing programmable dynamic bus inversion.

FIG. 5 is a flow diagram of an embodiment of a process for implementing programmable dynamic bus inversion. Process 500 describes applying DBI to achieve a ratio of ones to zeros. In one embodiment, a control entity configures a target ratio of ones to zeros for a DBI engine, 502. The control entity can be a host system that can dynamically change based on operating conditions within a device. The control entity can be a test system that configures the target ratio based on performance of the system under test. The control entity can be a configuration system that programs the device for operation based on the architecture and setup of the system in which the inter-device communication interface associated with the DBI engine is placed.

In one embodiment, process 500 can be understood with reference to the operation of a transmitting device for two devices that share an inter-device communication interface. In one embodiment, process 500 can be understood with reference to the operation of a memory controller device sending commands to a memory device or DRAM. In one embodiment, the memory device can employ a similar or identical flow with respect to sending data to the memory controller. In one embodiment, a non-memory I/O interface can operate in a similar manner, as will be understood by those skilled in the art. Thus, the example is non-limiting. In one embodiment, a memory controller can receive a memory access request from a host, 504. The operating system or an application executed by the host generates a request for data based on its execution. The memory controller can generate a command signal to implement the data access request, 506.

In one embodiment, the memory controller includes a DBI engine or DBI logic that performs a DBI calculation at least in part dependent on achieving a target ratio of ones and zeros. Thus, the DBI logic can identify the number of ones and/or zeros for a noninverted signal and for an inverted version of the signal, 508. The signal referred to is a signal or combination of bits to be output by the memory controller to the memory device to indicate the request. The signal refers to all bits to be sent over a group of signal lines associated with the DBI logic and a DBI indication signal.

In one embodiment, the DBI logic computes an average ratio based on a ratio of ones and zeros in the noninverted signal, 510. In one embodiment, the DBI logic computes an average ratio based on a ratio of ones and zeros in the inverted signal, 512. In one embodiment, the DBI logic determines whether the ratio in the noninverted signal or the inverted signal provides the calculated average closest to the target ratio, 514. Providing the calculated average closest to the target ratio can include moving the calculated average ratio closer to the target ratio and/or maintaining the calculated average closer to the target ratio.

In one embodiment, determining whether the ratio of the noninverted or inverted signal provides the calculated average ratio closer to the target ratio includes keeping a running difference of ones and zeros in an accumulator. In one embodiment, the running difference is a signed value. In one embodiment, the target ratio is a one-to-one ratio. In one embodiment, the target ratio is other than one-to-one. In one embodiment, the receiving device employs VTT termination, and the target ratio is configured to achieve a DC balance with respect to the VTT termination.

In one embodiment, if the number or ratio of ones and zeros in the noninverted signal provides a calculated ratio closer to the target ratio, 516 NONINVERTED branch, in one embodiment, the DBI logic can generate a negative DBI indication. The negative DBI indication can simply be no DBI indication. The negative DBI indication can be a logic value output that indicates DBI is not applied to the group of signal lines. The transmitting device then transmits the noninverted signal without inverting the signal, 518. In one embodiment, if the number or ratio of ones and zeros in the noninverted signal provides a calculated ratio closer to the target ratio, 516 INVERTED branch, in one embodiment, the DBI logic generates an affirmative inversion indicator, 520. Such an affirmative inversion indicator signals the receiving device that the associated signal line group has been inverted. The transmitting device then inverts the signal and sends the inverted signal to the receiving device 522.

Figure 6:
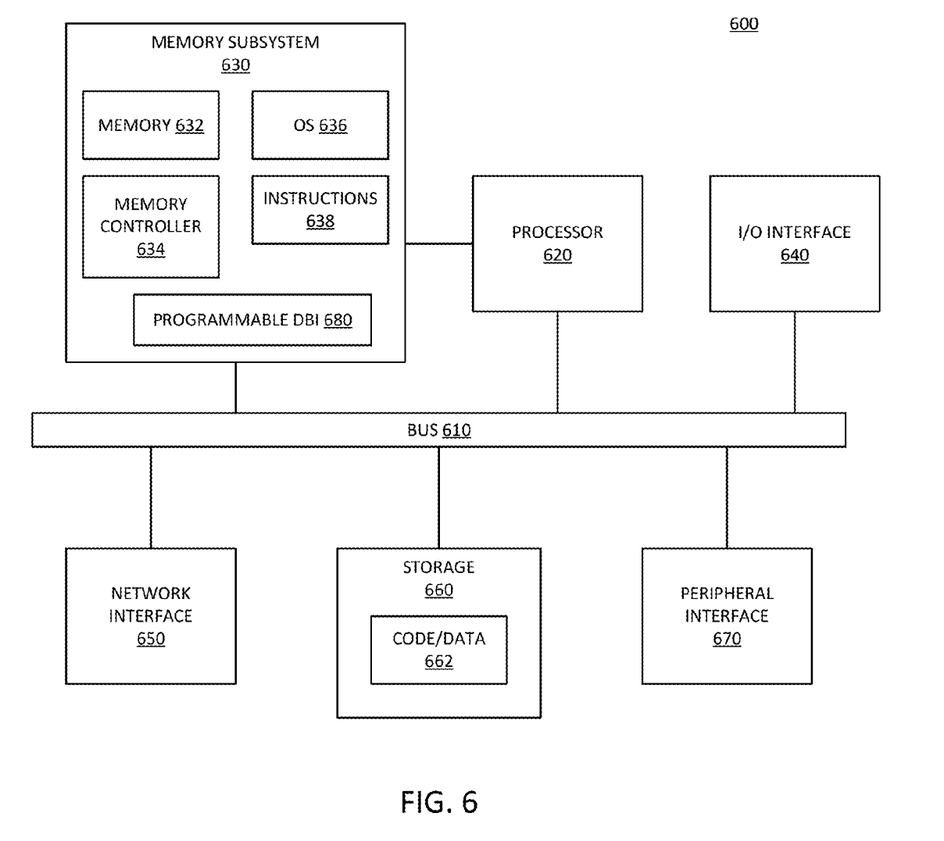
FIG. 6 is a block diagram of an embodiment of a computing system in which programmable dynamic bus inversion can be implemented.

FIG. 6 is a block diagram of an embodiment of a computing system in which programmable dynamic bus inversion can be implemented. System 600 represents a computing device in accordance with any embodiment described herein, and can be a laptop computer, a desktop computer, a server, a gaming or entertainment control system, a scanner, copier, printer, routing or switching device, or other electronic device. System 600 includes processor 620, which provides processing, operation management, and execution of instructions for system 600. Processor 620 can include any type of microprocessor, central processing unit (CPU), processing core, or other processing hardware to provide processing for system 600. Processor 620 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 630 represents the main memory of system 600, and provides temporary storage for code to be executed by processor 620, or data values to be used in executing a routine. Memory subsystem 630 can include one or more memory devices such as read-only memory (ROM), flash memory, one or more varieties of random access memory (RAM), or other memory devices, or a combination of such devices. Memory subsystem 630 stores and hosts, among other things, operating system (OS) 636 to provide a software platform for execution of instructions in system 600. Additionally, other instructions 638 are stored and executed from memory subsystem 630 to provide the logic and the processing of system 600. OS 636 and instructions 638 are executed by processor 620. Memory subsystem 630 includes memory device 632 where it stores data, instructions, programs, or other items. In one embodiment, memory subsystem includes memory controller 634, which is a memory controller to generate and issue commands to memory device 632. It will be understood that memory controller 634 could be a physical part of processor 620.

Processor 620 and memory subsystem 630 are coupled to bus/bus system 610. Bus 610 is an abstraction that represents any one or more separate physical buses, communication lines/interfaces, and/or point-to-point connections, connected by appropriate bridges, adapters, and/or controllers. Therefore, bus 610 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 610 can also correspond to interfaces in network interface 650.

System 600 also includes one or more input/output (I/O) interface(s) 640, network interface 650, one or more internal mass storage device(s) 660, and peripheral interface 670 coupled to bus 610. I/O interface 640 can include one or more interface components through which a user interacts with system 600 (e.g., video, audio, and/or alphanumeric interfacing). Network interface 650 provides system 600 the ability to communicate with remote devices (e.g., servers, other computing devices) over one or more networks. Network interface 650 can include an Ethernet adapter, wireless interconnection components, USB (universal serial bus), or other wired or wireless standards-based or proprietary interfaces.

Storage 660 can be or include any conventional medium for storing large amounts of data in a nonvolatile manner, such as one or more magnetic, solid state, or optical based disks, or a combination. Storage 660 holds code or instructions and data 662 in a persistent state (i.e., the value is retained despite interruption of power to system 600). Storage 660 can be generically considered to be a "memory," although memory 630 is the executing or operating memory to provide instructions to processor 620. Whereas storage 660 is nonvolatile, memory 630 can include volatile memory (i.e., the value or state of the data is indeterminate if power is interrupted to system 600).

Peripheral interface 670 can include any hardware interface not specifically mentioned above. Peripherals refer generally to devices that connect dependently to system 600. A dependent connection is one where system 600 provides the software and/or hardware platform on which operation executes, and with which a user interacts.

In one embodiment, memory subsystem 630 and/or any other subsystem (e.g., processor 620, I/O interface 640, and/or others) includes an inter-device I/O interface that is subject to the application of DBI. The DBI logic can be programmable as represented by programmable DBI 680 to achieve a desired ratio of ones to zeros in transmission across the I/O interface. Such a programmable DBI includes a mechanism to store history of previous transmissions (e.g., an accumulator or a register to store a calculated average ratio), and a programmable target ratio. The DBI logic or DBI calculation accounts for the target ratio and the previous calculated ratio in determining whether to apply DBI to a signal to transmit. If a noninverted signal provides a calculated ratio closer to the target ratio, the transmitting device transmits the noninverted signal. If the inverted signal provides a calculated ratio closer to the target ratio, the transmitting device applies DBI to the signal and transmits an inverted signal.

Figure 7:
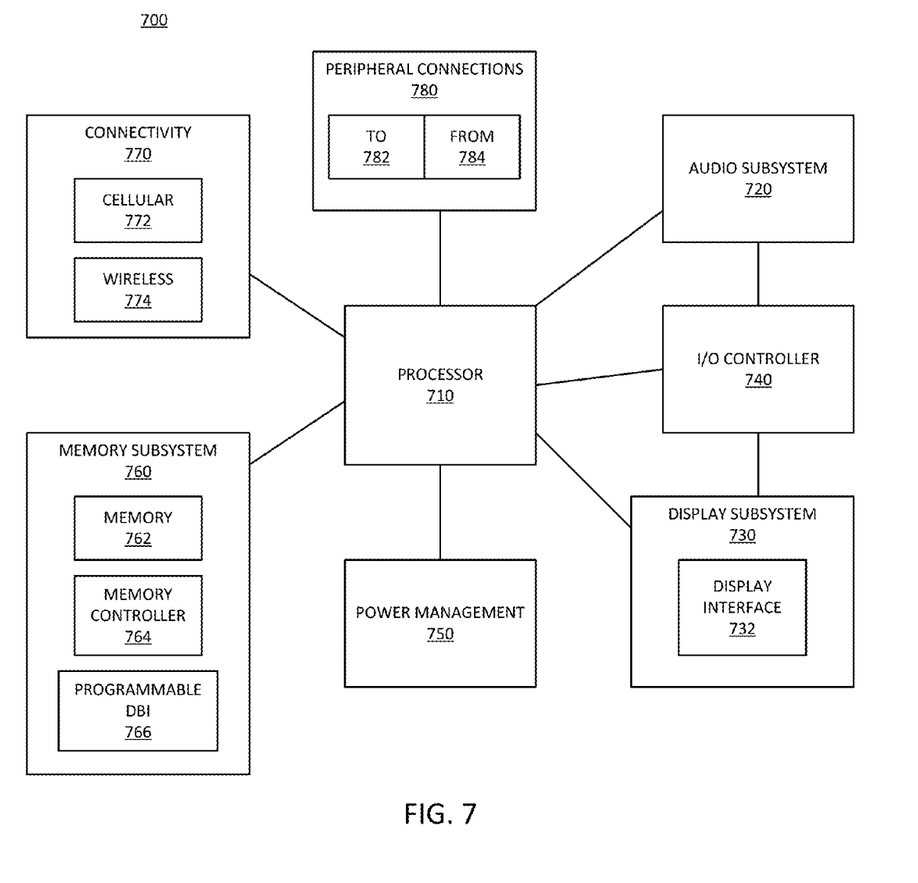
FIG. 7 is a block diagram of an embodiment of a mobile device in which programmable dynamic bus inversion can be implemented.

FIG. 7 is a block diagram of an embodiment of a mobile device in which programmable dynamic bus inversion can be implemented. Device 700 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 700.

Device 700 includes processor 710, which performs the primary processing operations of device 700. Processor 710 can include one or more physical devices, such as microprocessors, application processors, microcontrollers, programmable logic devices, or other processing means. The processing operations performed by processor 710 include the execution of an operating platform or operating system on which applications and/or device functions are executed. The processing operations include operations related to I/O (input/output) with a human user or with other devices, operations related to power management, and/or operations related to connecting device 700 to another device. The processing operations can also include operations related to audio I/O and/or display I/O.

In one embodiment, device 700 includes audio subsystem 720, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 700, or connected to device 700. In one embodiment, a user interacts with device 700 by providing audio commands that are received and processed by processor 710.

Display subsystem 730 represents hardware (e.g., display devices) and software (e.g., drivers) components that provide a visual and/or tactile display for a user to interact with the computing device. Display subsystem 730 includes display interface 732, which includes the particular screen or hardware device used to provide a display to a user. In one embodiment, display interface 732 includes logic separate from processor 710 to perform at least some processing related to the display. In one embodiment, display subsystem 730 includes a touchscreen device that provides both output and input to a user. In one embodiment, display subsystem 730 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others.

I/O controller 740 represents hardware devices and software components related to interaction with a user. I/O controller 740 can operate to manage hardware that is part of audio subsystem 720 and/or display subsystem 730. Additionally, I/O controller 740 illustrates a connection point for additional devices that connect to device 700 through which a user might interact with the system. For example, devices that can be attached to device 700 might include microphone devices, speaker or stereo systems, video systems or other display device, keyboard or keypad devices, or other I/O devices for use with specific applications such as card readers or other devices.

As mentioned above, I/O controller 740 can interact with audio subsystem 720 and/or display subsystem 730. For example, input through a microphone or other audio device can provide input or commands for one or more applications or functions of device 700. Additionally, audio output can be provided instead of or in addition to display output. In another example, if display subsystem includes a touchscreen, the display device also acts as an input device, which can be at least partially managed by I/O controller 740. There can also be additional buttons or switches on device 700 to provide I/O functions managed by I/O controller 740.

In one embodiment, I/O controller 740 manages devices such as accelerometers, cameras, light sensors or other environmental sensors, gyroscopes, global positioning system (GPS), or other hardware that can be included in device 700. The input can be part of direct user interaction, as well as providing environmental input to the system to influence its operations (such as filtering for noise, adjusting displays for brightness detection, applying a flash for a camera, or other features). In one embodiment, device 700 includes power management 750 that manages battery power usage, charging of the battery, and features related to power saving operation.

Memory subsystem 760 includes memory device(s) 762 for storing information in device 700. Memory subsystem 760 can include nonvolatile (state does not change if power to the memory device is interrupted) and/or volatile (state is indeterminate if power to the memory device is interrupted) memory devices. Memory 760 can store application data, user data, music, photos, documents, or other data, as well as system data (whether long-term or temporary) related to the execution of the applications and functions of system 700. In one embodiment, memory subsystem 760 includes memory controller 764 (which could also be considered part of the control of system 700, and could potentially be considered part of processor 710). Memory controller 764 includes a scheduler to generate and issue commands to memory device 762.

Connectivity 770 includes hardware devices (e.g., wireless and/or wired connectors and communication hardware) and software components (e.g., drivers, protocol stacks) to enable device 700 to communicate with external devices. The external device could be separate devices, such as other computing devices, wireless access points or base stations, as well as peripherals such as headsets, printers, or other devices.

Connectivity 770 can include multiple different types of connectivity. To generalize, device 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 774 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 780 include hardware interfaces and connectors, as well as software components (e.g., drivers, protocol stacks) to make peripheral connections. It will be understood that device 700 could both be a peripheral device ("to" 782) to other computing devices, as well as have peripheral devices ("from" 784) connected to it. Device 700 commonly has a "docking" connector to connect to other computing devices for purposes such as managing (e.g., downloading and/or uploading, changing, synchronizing) content on device 700. Additionally, a docking connector can allow device 700 to connect to certain peripherals that allow device 700 to control content output, for example, to audiovisual or other systems.

In addition to a proprietary docking connector or other proprietary connection hardware, device 700 can make peripheral connections 780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, memory subsystem 760 and/or any other subsystem (e.g., processor 710, display subsystem 730, peripheral connections 780, and/or others) includes an inter-device I/O interface that is subject to the application of DBI. The DBI logic can be programmable as represented by programmable DBI 766 to achieve a desired ratio of ones to zeros in transmission across the I/O interface. Such a programmable DBI includes a mechanism to store history of previous transmissions (e.g., an accumulator or a register to store a calculated average ratio), and a programmable target ratio. The DBI logic or DBI calculation accounts for the target ratio and the previous calculated ratio in determining whether to apply DBI to a signal to transmit. If a noninverted signal provides a calculated ratio closer to the target ratio, the transmitting device transmits the noninverted signal. If the inverted signal provides a calculated ratio closer to the target ratio, the transmitting device applies DBI to the signal and transmits an inverted signal.

In one aspect, a method for inter-device signal transmission includes: receiving a signal to be transmitted over an input/output (I/O) interface; identifying a ratio of ones and zeros in a noninverted version of the signal ("noninverted signal") and a ratio of ones and zeros in an inverted version of the signal ("inverted signal"); determining if the ratio of ones and zeros in the noninverted signal or the ratio of ones and zeros in the inverted signal provides a calculated average ratio of ones to zeros closer to a target ratio of ones or zeros; and sending the noninverted signal over the I/O interface when the ratio of ones and zeros in the noninverted signal provides the calculated average ratio closer to the target ratio; or sending the inverted signal over the I/O interface, including generating an inversion indication signal, when the ratio of ones and zeros in the inverted signal provides the calculated average ratio closer to the target ratio.

In one embodiment, determining further comprises keeping a running net signed difference of ones and zeros in an accumulator. In one embodiment, the target ratio is one-to-one and wherein the determining comprises determining whether the noninverted signal or the inverted signal provides the calculated average ratio closer to a net difference of zero. In one embodiment, the target ratio is other than one-to-one and wherein the determining comprises determining whether the noninverted signal or the inverted signal provides the calculated average ratio closer to a net difference to achieve the target ratio. In one embodiment, the keeping the running net signed difference comprises keeping separate running net signed differences for different ranks. In one embodiment, the keeping the running net signed difference comprises keeping separate running net signed differences for different devices. In one embodiment, the I/O interface has a Vtt termination, where the signal lines of the I/O interface are terminated to a voltage between upper and lower voltage supply rails. In one embodiment, further comprising calculating the target ratio to achieve a target level of DC (direct current) balance across the I/O interface. In one embodiment, further comprising selectively applying the determining if the ratio of ones and zeros in the noninverted signal or the ratio of ones and zeros in the inverted signal provides the calculated average ratio of ones to zeros closer to the target ratio, to a dynamic bus inversion implementation. In one embodiment, the selectively applying further comprises: selectively switching between determining if the noninverted signal or the inverted signal provides the calculated average ratio of ones to zeros closer to the target ratio, and sending the signal that provides the calculated average ratio closer to the target ratio; and implementing dynamic bus inversion to either reduce a number of toggles on the output signal or reduce a number of ones transmitted. In one embodiment, the selectively switching further comprises: applying dynamic bus inversion to provide a calculated average ratio closer to the target ratio unless the ratio of ones to zeros in the noninverted an inverted signal is within a predetermined range; and otherwise, applying dynamic bus inversion to either reduce the number of toggles on the output signal or reduce the number of ones transmitted. In one embodiment, receiving the signal to be transmitted comprises receiving one of multiple signals of a series of consecutive output transactions; and wherein identifying the ratios of ones and zeros comprises identifying the ratios over the series of consecutive output transactions; and wherein determining if the ratio of ones and zeros in the noninverted signal or inverted signal provides the calculated average ratio closer to the target ratio comprises determining if the ratio of one to zeros in the one received signal provides the calculated average ratio closer to the target ratio for the series of consecutive output transactions.

In one aspect, a circuit including a transmitting device and a receiving device coupled for communication includes: hardware connectors to couple the transmitting device to the receiving device over an input/output (I/O) interface; a buffer to receive a signal to be transmitted over the I/O interface to the receiving device; and logic to identify a ratio of ones and zeros in a noninverted version of the signal ("noninverted signal") and a ratio of ones and zeros in an inverted version of the signal ("inverted signal"); determine if the ratio of ones and zeros in the noninverted signal or the ratio of ones and zeros in the inverted signal provides a calculated average ratio of ones to zeros closer to a target ratio of ones or zeros; and transmit the noninverted signal over the I/O interface when the ratio of ones and zeros in the noninverted signal provides the calculated average ratio closer to the target ratio; or transmit the inverted signal over the I/O interface, including generating an inversion indication signal, when the ratio of ones and zeros in the inverted signal provides the calculated average ratio closer to the target ratio.

In one embodiment, the circuit further comprising: an accumulator to maintain a running net signed difference of ones and zeros transmitted over the interface. In one embodiment, the logic to determine further comprises the logic to compare the running net signed difference with a difference of ones and zeros in the noninverted signal and in the inverted signal. In one embodiment, the target ratio is one-to-one and wherein the logic to determine comprises the logic to compute whether the noninverted signal or the inverted signal provides the calculated average ratio closer to a net difference of zero. In one embodiment, the target ratio is other than one-to-one and wherein the logic to determine comprises the logic to compute whether the noninverted signal or the inverted signal provides the calculated average ratio closer to a net difference to achieve the target ratio. In one embodiment, the accumulator comprises one of multiple accumulators, one each to keep a running net signed difference for different ranks. In one embodiment, the accumulator comprises one of multiple accumulators, one each to keep a running net signed difference for different devices. In one embodiment, the I/O interface has a Vtt termination, where the signal lines of the I/O interface are terminated to a voltage between upper and lower voltage supply rails. In one embodiment, further comprising the logic to calculate the target ratio to achieve a target level of DC (direct current) balance across the I/O interface. In one embodiment, the logic comprises dynamic bus inversion logic. In one embodiment, the logic is to selectively switch between determining if the noninverted signal or the inverted signal provides the calculated average ratio of ones to zeros closer to the target ratio, and sending the signal that provides the calculated average ratio closer to the target ratio; and implementing dynamic bus inversion to either reduce a number of toggles on the output signal or reduce a number of ones transmitted. In one embodiment, the logic is to further apply dynamic bus inversion to provide a calculated average ratio closer to the target ratio unless the ratio of ones to zeros in the noninverted an inverted signal is within a predetermined range; and otherwise, apply dynamic bus inversion to either reduce the number of toggles on the output signal or reduce the number of ones transmitted. In one embodiment, the signal comprises one of multiple signals of a series of consecutive output transactions; and wherein the logic is to identify the ratios over the series of consecutive output transactions; and wherein the logic is to determine which ratio provides the calculated average ratio closer to the target ratio for the series of consecutive output transactions.

In one aspect an electronic device with a memory subsystem, comprising: a memory device; an input/output (I/O) interface coupled to the memory device; and a memory controller coupled to the memory device over the I/O interface, the memory controller including a buffer to receive a signal to be transmitted over the I/O interface to the memory device; and logic to identify a ratio of ones and zeros in a noninverted version of the signal ("noninverted signal") and a ratio of ones and zeros in an inverted version of the signal ("inverted signal"); determine if the ratio of ones and zeros in the noninverted signal or the ratio of ones and zeros in the inverted signal provides a calculated average ratio of ones to zeros closer to a target ratio of ones or zeros; and transmit the noninverted signal over the I/O interface when the ratio of ones and zeros in the noninverted signal provides the calculated average ratio closer to the target ratio; or transmit the inverted signal over the I/O interface, including generating an inversion indication signal, when the ratio of ones and zeros in the inverted signal provides the calculated average ratio closer to the target ratio; and a touchscreen display coupled to generate a display based on data accessed from the memory device. Any embodiment described with respect to the circuit including a transmitting device and a receiving device coupled for communication can also apply to the electronic device.

In one aspect, an article of manufacture comprising a computer readable storage medium having content stored thereon, which when accessed causes a computing device to perform operations for inter-device signal transmission including: receiving a signal to be transmitted over an input/output (I/O) interface; identifying a ratio of ones and zeros in a noninverted version of the signal ("noninverted signal") and a ratio of ones and zeros in an inverted version of the signal ("inverted signal"); determining if the ratio of ones and zeros in the noninverted signal or the ratio of ones and zeros in the inverted signal provides a calculated average ratio of ones to zeros closer to a target ratio of ones or zeros; and sending the noninverted signal over the I/O interface when the ratio of ones and zeros in the noninverted signal provides the calculated average ratio closer to the target ratio; or sending the inverted signal over the I/O interface, including generating an inversion indication signal, when the ratio of ones and zeros in the inverted signal provides the calculated average ratio closer to the target ratio. Any embodiment described with respect to the method for inter-device signal transmission can also apply to the article of manufacture.

In one aspect, an apparatus for inter-device signal transmission, comprising: means for receiving a signal to be transmitted over an input/output (I/O) interface; means for identifying a ratio of ones and zeros in a noninverted version of the signal ("noninverted signal") and a ratio of ones and zeros in an inverted version of the signal ("inverted signal"); means for determining if the ratio of ones and zeros in the noninverted signal or the ratio of ones and zeros in the inverted signal provides a calculated average ratio of ones to zeros closer to a target ratio of ones or zeros; and means for sending the noninverted signal over the I/O interface when the ratio of ones and zeros in the noninverted signal provides the calculated average ratio closer to the target ratio; or sending the inverted signal over the I/O interface, including generating an inversion indication signal, when the ratio of ones and zeros in the inverted signal provides the calculated average ratio closer to the target ratio. Any embodiment described with respect to the method for inter-device signal transmission can also apply to the apparatus.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for inter-device signal transmission, comprising:

receiving a signal to be transmitted over an input/output (I/O) interface;
identifying a ratio of ones and zeros in a noninverted version of the signal ("noninverted signal") and a ratio of ones and zeros in an inverted version of the signal ("inverted signal");
determining if the ratio of ones and zeros in the noninverted signal or the ratio of ones and zeros in the inverted signal provides a calculated average ratio of ones to zeros closer to a target ratio of ones or zeros; and
sending the noninverted signal over the I/O interface when the ratio of ones and zeros in the noninverted signal provides the calculated average ratio closer to the target ratio; or
sending the inverted signal over the I/O interface, including generating an inversion indication signal, when the ratio of ones and zeros in the inverted signal provides the calculated average ratio closer to the target ratio.

2. The method of claim 1, wherein determining further comprises keeping a running net signed difference of ones and zeros in an accumulator.

3. The method of claim 2, wherein the target ratio is one-to-one and wherein the determining comprises determining whether the noninverted signal or the inverted signal provides the calculated average ratio closer to a net difference of zero.

4. The method of claim 2, wherein the target ratio is other than one-to-one and wherein the determining comprises determining whether the noninverted signal or the inverted signal provides the calculated average ratio closer to a net difference to achieve the target ratio.

5. The method of claim 1, wherein the I/O interface has a Vtt termination, where the signal lines of the I/O interface are terminated to a voltage between upper and lower voltage supply rails.

6. The method of claim 1, further comprising calculating the target ratio to achieve a target level of DC (direct current) balance across the I/O interface.

7. The method of claim 1, further comprising selectively applying the determining if the ratio of ones and zeros in the noninverted signal or the ratio of ones and zeros in the inverted signal provides the calculated average ratio of ones to zeros closer to the target ratio, to a dynamic bus inversion implementation.

8. The method of claim 7, wherein the selectively applying further comprises:
selectively switching between
determining if the noninverted signal or the inverted signal provides the calculated average ratio of ones to zeros closer to the target ratio, and sending the signal that provides the calculated average ratio closer to the target ratio; and
implementing dynamic bus inversion to either reduce a number of toggles on the output signal or reduce a number of ones transmitted.

9. The method of claim 8, wherein the selectively switching further comprises:
applying dynamic bus inversion to provide a calculated average ratio closer to the target ratio unless the ratio of ones to zeros in the noninverted an inverted signal is within a predetermined range; and otherwise,
applying dynamic bus inversion to either reduce the number of toggles on the output signal or reduce the number of ones transmitted.

10. The method of claim 1, wherein receiving the signal to be transmitted comprises receiving one of multiple signals of a series of consecutive output transactions; and wherein identifying the ratios of ones and zeros comprises identifying the ratios over the series of consecutive output transactions; and wherein determining if the ratio of ones and zeros in the noninverted signal or inverted signal provides the calculated average ratio closer to the target ratio comprises determining if the ratio of one to zeros in the one received signal provides the calculated average ratio closer to the target ratio for the series of consecutive output transactions.

11. A circuit including a transmitting device and a receiving device coupled for communication, comprising:
   hardware connectors to couple the transmitting device to the receiving device over an input/output (I/O) interface;
   a buffer to receive a signal to be transmitted over the I/O interface to the receiving device; and
   logic to identify a ratio of ones and zeros in a noninverted version of the signal ("noninverted signal") and a ratio of ones and zeros in an inverted version of the signal ("inverted signal"); determine if the ratio of ones and zeros in the noninverted signal or the ratio of ones and zeros in the inverted signal provides a calculated average ratio of ones to zeros closer to a target ratio of ones or zeros; and transmit the noninverted signal over the I/O interface when the ratio of ones and zeros in the noninverted signal provides the calculated average ratio closer to the target ratio; or transmit the inverted signal over the I/O interface, including generating an inversion indication signal, when the ratio of ones and zeros in the inverted signal provides the calculated average ratio closer to the target ratio.

12. The circuit of claim 11, further comprising:
   an accumulator to maintain a running net signed difference of ones and zeros transmitted over the interface.

13. The circuit of claim 12, wherein the logic to determine further comprises the logic to compare the running net signed difference with a difference of ones and zeros in the noninverted signal and in the inverted signal.

14. The circuit of claim 12, wherein the target ratio is one-to-one and wherein the logic to determine comprises the logic to compute whether the noninverted signal or the inverted signal provides the calculated average ratio closer to a net difference of zero.

15. The circuit of claim 12, wherein the target ratio is other than one-to-one and wherein the logic to determine comprises the logic to compute whether the noninverted signal or the inverted signal provides the calculated average ratio closer to a net difference to achieve the target ratio.

16. The circuit of claim 12, wherein the accumulator comprises one of multiple accumulators, one each to keep a running net signed difference for different ranks, or one each to keep a running net signed difference for different devices.

17. The circuit of claim 11, wherein the I/O interface has a Vtt termination, where the signal lines of the I/O interface are terminated to a voltage between upper and lower voltage supply rails.

18. The circuit of claim 11, further comprising the logic to calculate the target ratio to achieve a target level of DC (direct current) balance across the I/O interface.

19. An electronic device with a memory subsystem, comprising:
   a memory device;
   an input/output (I/O) interface coupled to the memory device; and
   a memory controller coupled to the memory device over the I/O interface, the memory controller including a buffer to receive a signal to be transmitted over the I/O interface to the memory device; and logic to identify a ratio of ones and zeros in a noninverted version of the signal ("noninverted signal") and a ratio of ones and zeros in an inverted version of the signal ("inverted signal"); determine if the ratio of ones and zeros in the noninverted signal or the ratio of ones and zeros in the inverted signal provides a calculated average ratio of ones to zeros closer to a target ratio of ones or zeros; and transmit the noninverted signal over the I/O interface when the ratio of ones and zeros in the noninverted signal provides the calculated average ratio closer to the target ratio; or transmit the inverted signal over the I/O interface, including generating an inversion indication signal, when the ratio of ones and zeros in the inverted signal provides the calculated average ratio closer to the target ratio; and
   a touchscreen display coupled to generate a display based on data accessed from the memory device.

20. The electronic device of claim 19, the memory controller further comprising:
   an accumulator to maintain a running net signed difference of ones and zeros transmitted over the interface.

21. The electronic device of claim 20, wherein the target ratio is one-to-one and wherein the logic to determine comprises the logic to compute whether the noninverted signal or the inverted signal provides the calculated average ratio closer to a net difference of zero.

22. The electronic device of claim 19, further comprising the logic to calculate the target ratio to achieve a target level of DC (direct current) balance across the I/O interface.

* * * * *